J. W. RUGER.
ROLL STAMPING MACHINE.
APPLICATION FILED JUNE 14, 1916.

1,291,168.

Patented Jan. 14, 1919.
4 SHEETS—SHEET 1.

INVENTOR
James W. Ruger
by Geyer & Popp
ATTORNEYS

J. W. RUGER.
ROLL STAMPING MACHINE.
APPLICATION FILED JUNE 14, 1916.

1,291,168.

Patented Jan. 14, 1919.
4 SHEETS—SHEET 2.

INVENTOR
James W. Ruger
by Geyer & Popp
ATTORNEYS

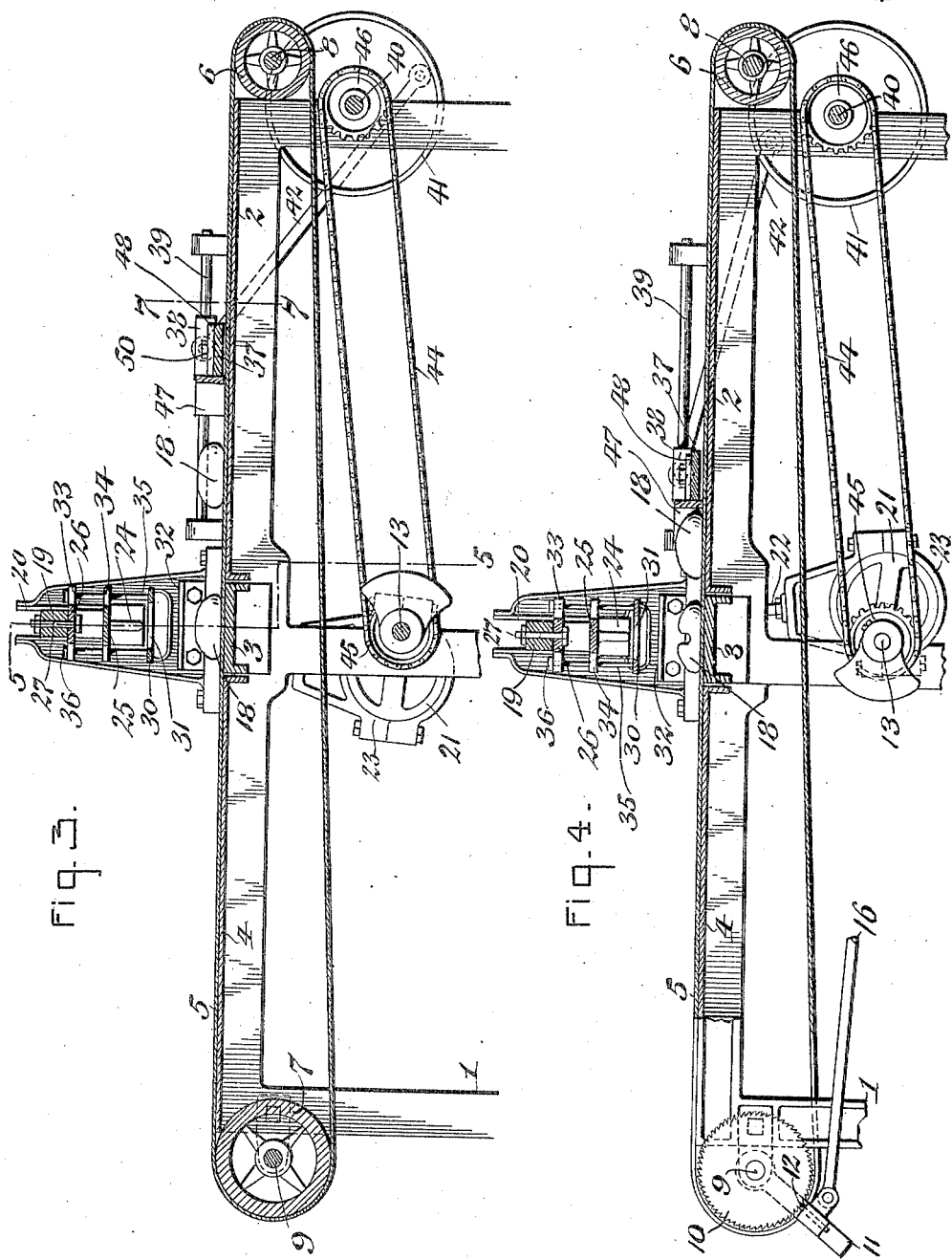

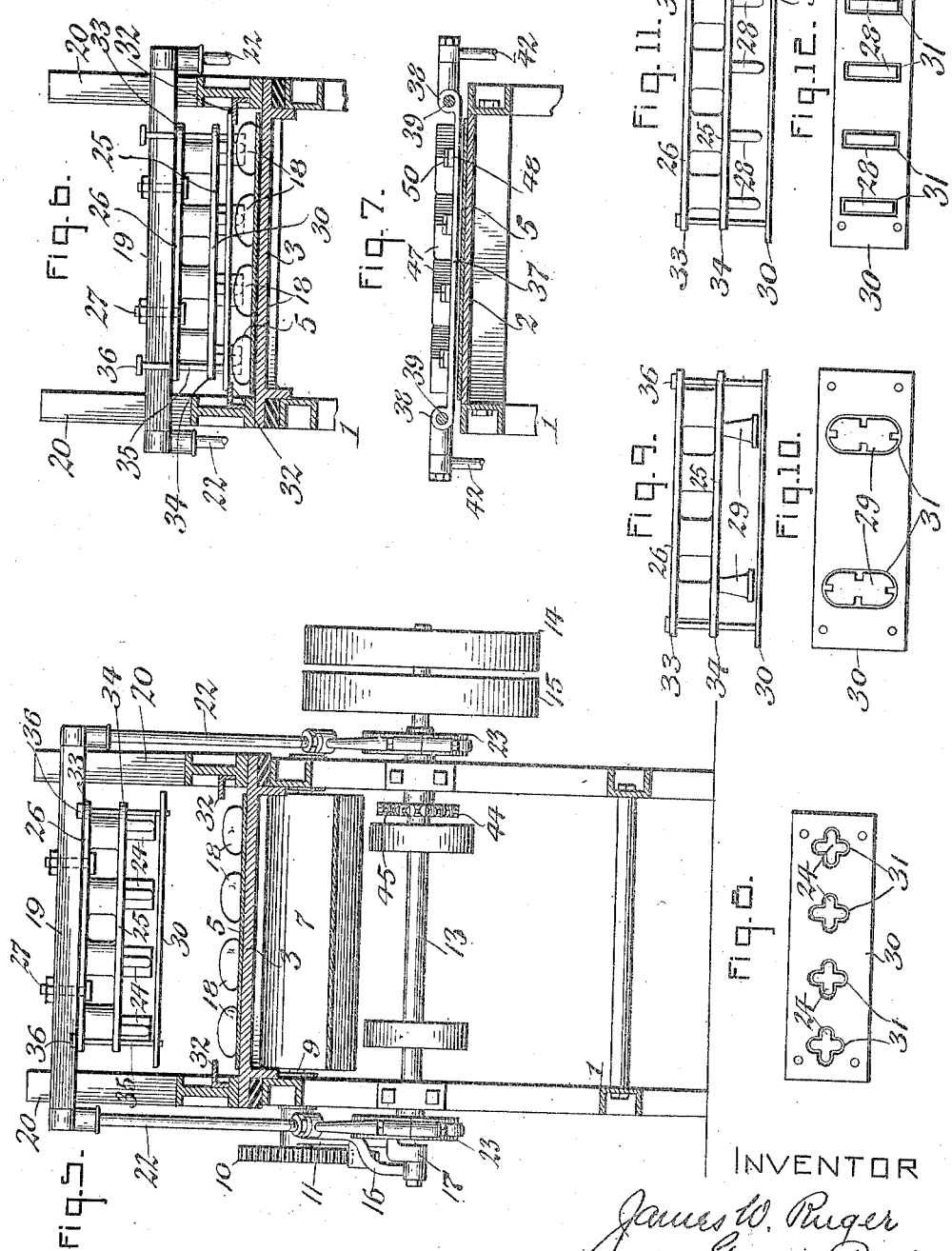

UNITED STATES PATENT OFFICE.

JAMES W. RUGER, OF BUFFALO, NEW YORK, ASSIGNOR TO WALLACE K. RUGER, OF BUFFALO, NEW YORK.

ROLL-STAMPING MACHINE.

1,291,168.      Specification of Letters Patent.      Patented Jan. 14, 1919.

Application filed June 14, 1916. Serial No. 103,663.

*To all whom it may concern:*

Be it known that I, JAMES W. RUGER, a citizen of the United States, residing at Buffalo, in the county of Erie and State of New York, have invented new and useful Improvements in Roll-Stamping Machines, of which the following is a specification.

This invention relates to a machine for stamping, pressing or indenting the upper sides of balls or lumps of dough preparatory to baking the same in the manufacture of baked goods commonly known as kümmel wecks, hot cross buns, Parker House rolls, hard or Vienna rolls and the like.

The object of this invention is to produce a machine whereby this stamping, pressing or indenting of the balls or lumps of dough may be effected easily, expeditiously and economically so as to permit the output of a bakery in this class of goods to be materially increased at a reduced cost.

Figure 1:
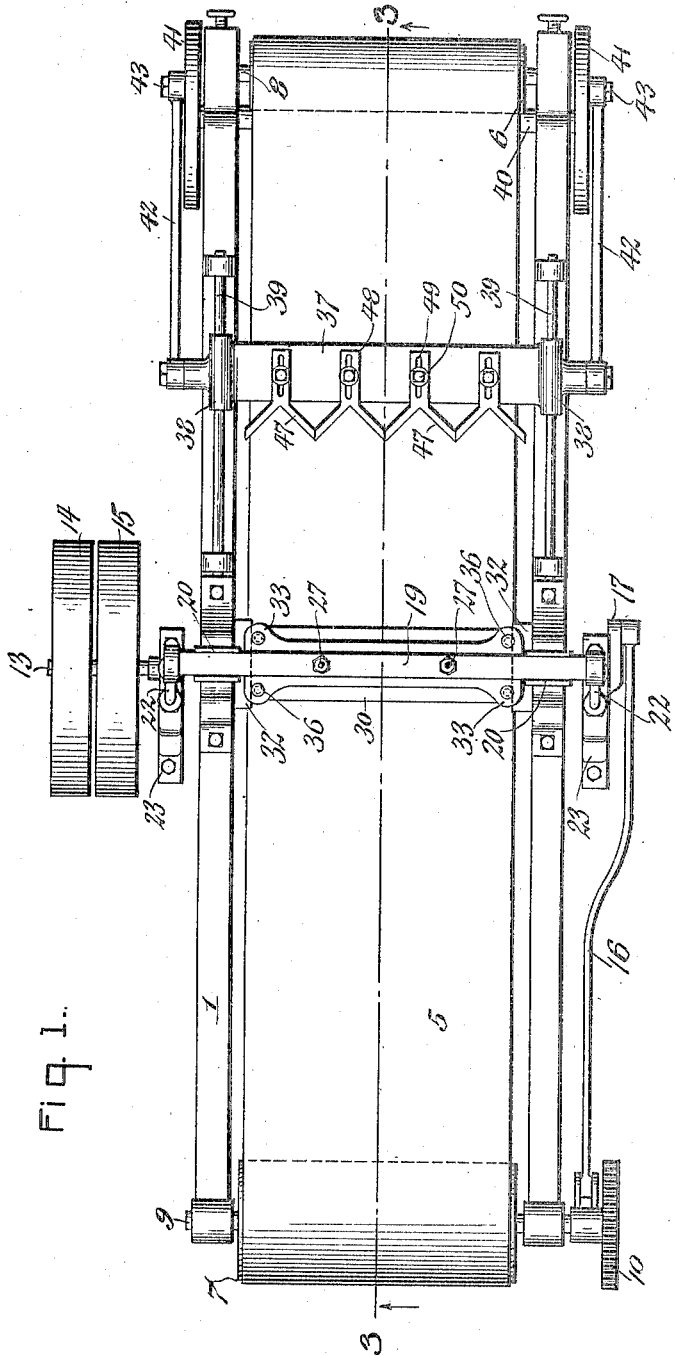
Figure 2:
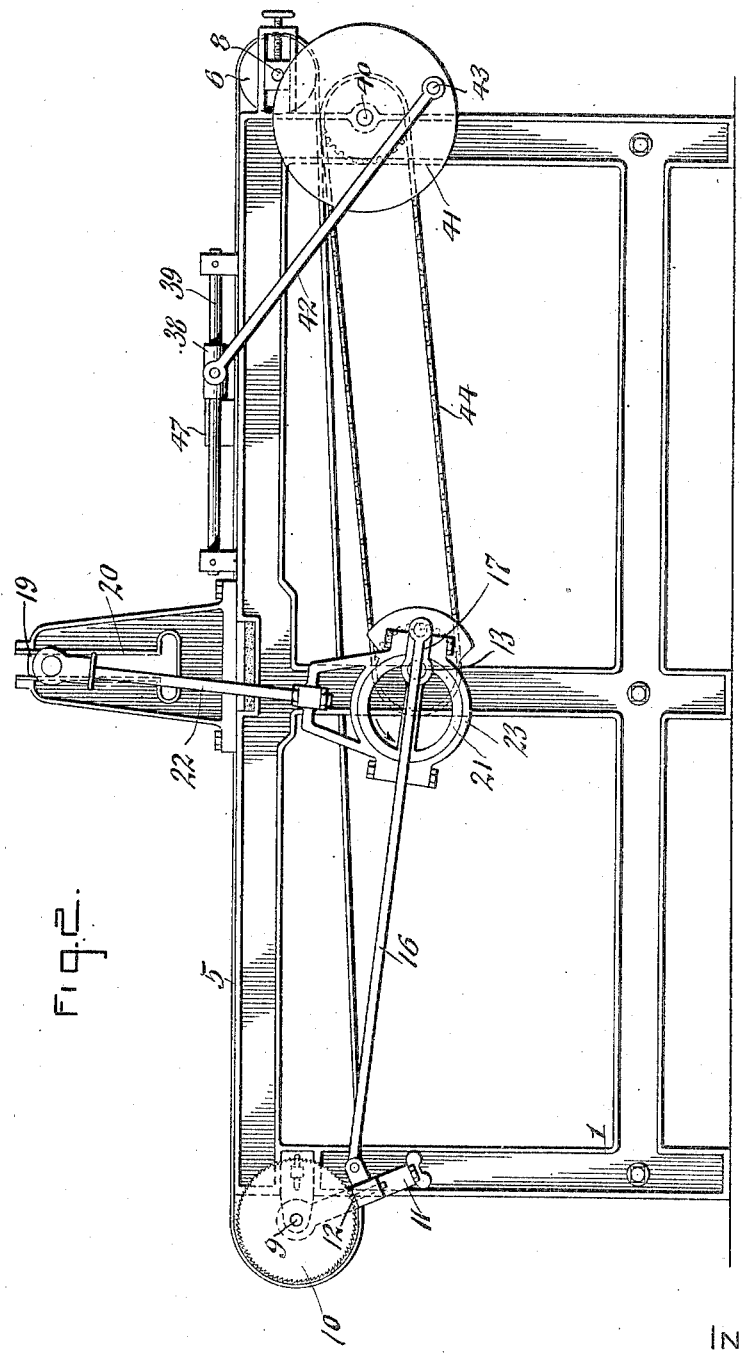

In the accompanying drawings:

Figure 1 is a top plan view of a roll stamping machine embodying my improvements. Fig. 2 is a side elevation of the same. Fig. 3 is a fragmentary vertical longitudinal section of the machine showing one position of its working parts. Fig. 4 is a similar view showing another position of the working parts. Fig. 5 is a fragmentary vertical transverse section of the machine, taken on line 5—5, Fig. 3, and showing the stamping dies in their elevated or inoperative position. Fig. 6 is a similar view showing the stamping dies in their depressed or operative position. Fig. 7 is a vertical transverse section taken on the correspondingly numbered line in Fig. 3. Fig. 8 is a bottom plan view of the die which is shown in Figs. 3–6 for stamping or indenting lumps of dough in the manufacture of kümmel wecks or hot cross buns. Fig. 9 is a detached side elevation of a pair of dies and associated parts which may be used for stamping or indenting lumps of dough in the manufacture of Parker House rolls. Fig. 10 is a bottom plan view of the same. Fig. 11 is a side elevation showing a set of dies and associated parts for use in the manufacture of hard or Vienna rolls. Fig. 12 is a bottom plan view of the same.

Similar characters of reference indicate corresponding parts throughout the several views.

1 represents the main frame of the machine which may be of any suitable construction to support the various working parts of the same. On its upper part this frame is provided with a table comprising a rear or receiving section 2, an intermediate or stamping section 3, and a front or delivery section 4. Over the several sections of the table extends a support whereby the lumps of dough are successively fed to the stamping position and then discharged therefrom, this support consisting preferably of an endless apron or belt 5 which moves with its upper operative stretch horizontally and lengthwise over the table and passes with its front and rear turns around supporting pulleys or drums 6, 7 which are mounted upon rear and front shafts 8, 9 journaled in suitable bearings on the adjacent parts of the main frame. An intermittent forward motion is imparted to this supporting or feeding apron which may be effected by various means, those shown in the drawings, as an example, being suitable and comprising a ratchet wheel 10 secured to one end of the front apron shaft 8, a rock arm 11 mounted loosely on the shaft 8 and provided with a feed dog 12 and engaging with the teeth of the ratchet wheel, a main driving shaft 13 journaled horizontally and transversely in suitable bearings on the main frame below the table and provided at one end with a tight driving pulley 14 and a loose pulley 15 and a connecting rod 16 connected at one end with the rock arm 11 and at its opposite end with a crank arm 17 on the other end of the driving shaft. By this means the apron is moved forwardly intermittently or step by step with an interval of rest between successive steps.

The lumps of dough 18 which are to be stamped, pressed or indented are placed upon the upper or operative stretch of the apron while the latter is on the receiving or rear part of the table and as the apron moves forwardly these lumps of the dough are carried over the central or stamping section of the table where they are operated upon by the means which stamp or press the same. This stamping device may be varied so far as the detail construction of the same is concerned but in the preferred form of this device which is shown in Figs. 1–8, the same is constructed as follows:

19 represents a vertically movable cross head which is arranged horizontally and transversely over the central or stamping section of the table and guided in vertical ways 20 projecting upwardly from the main frame on opposite sides of the path of the apron and at opposite ends of the central table section. The preferred means for effecting the vertical movement of this cross head comprises two eccentrics 21, 21 mounted on the main driving shaft adjacent to opposite sides of the main frame, and two connecting rods 22, 22 each of which is pivotally connected at its upper end with one end of the cross head 19 and provided at its lower end with a strap 23 surrounding the eccentric on the corresponding side of the main frame.

24 represents a plurality of dies arranged in a transverse horizontal row underneath the cross head 19 and moving vertically therewith. Four such dies are shown in the set in Figs. 5, 6 and 8 but this number may be varied to suit the size of the machine or the capacity desired. The several dies of each set are preferably connected at a point above their lower ends by means of a lower web or plate 25 and at their upper ends by an upper web or plate 26, said last mentioned plate being detachably secured to the underside of the cross head 19 by means of a plurality of bolts 27, as shown in Figs. 3, 4, 5 and 6, or by any other suitable means. By thus detachably connecting the set or gang of dies with the die supporting cross head it is possible to employ different shapes of dies in the machine in accordance with the particular kind of rolls which are to be made. The shape of the dies shown in Figs. 3–6 and 8 are more particularly designed for stamping or pressing lumps of dough for the manufacture of kümmel wecks or hot cross buns. If the machine is to be used for stamping or pressing lumps of dough for use in making Parker House rolls a set of dies are employed which are constructed like those shown at 29 in Figs. 9 and 10, and if hard or Vienna rolls are to be manufactured a set of dies are employed similar to those shown at 28 in Figs. 11 and 12 which last mentioned dies merely produce a transverse impression in each of the lumps of dough which are presented to the same. Any other suitably shaped dies may be employed according to the character of the design to be stamped or impressed upon the lumps of dough preparatory to baking the same.

While the dies are in an elevated or inoperative position the upper stretch of the apron moves forwardly and presents a row of dough lumps to the stamping position so that each of said lumps is vertically in line with one of the dies and then the apron comes to a standstill so that the lumps of dough are at rest while the dies stamp or impress the lumps of dough. After the dies have thus stamped or impressed the lumps of dough the same rise and while they are in their elevated position and out of engagement from the stamped lumps or loaves of dough the apron advances another step and carries the previously stamped lumps away from the stamping position and carries the next following set or row of lumps to the stamping position, this operation being repeated intermittently while the machine is running.

In order to prevent the lumps of dough after being stamped or impressed by the dies from sticking to the latter and carried upwardly from the apron by the dies a stripping device is provided which in its preferred form is constructed as follows:

30 represents a stripping plate or member arranged horizontally and transversely above the central or stamping section of the table and provided with a plurality of stripping openings 31 each of which is adapted to receive one of the stamping dies. This stripping plate is arranged below the lower ends of the dies when the latter are in their elevated position and moves downwardly in unison with the dies during the first portion of this movement, but during the last part of this movement and before the stripping plate engages with or bears to any considerable extent against the upper side of the lumps of dough the stripping plate is arrested while the dies continue their downward movement. During the last part of the downward movement of the dies independently of the stripping plate the dies move through the openings in the plate and into engagement with the upper side of the lumps of dough, as shown in Fig. 6, thereby stamping or impressing the design of the dies on the same. The downward movement of the stripping plate for this purpose is limited by a stop device which preferably consists of two stops 32 fixed on the main frame of the machine on opposite sides of the upper stretch of the apron adjacent to the central section of the table, as shown in Figs. 4, 5 and 6. During the first part of the subsequent upward movement of the die the same move independently of the stripping plate until the latter is again arranged below the lower ends of the dies, and thereafter during the last part of the upward movement of the dies the stripping plate moves in unison therewith, thereby causing the lumps of pressed dough which otherwise might stick to the dies to be forcibly stripped from the dies and to remain lying on the upper stretch of the apron. In order to cause the stripping plate to move with the dies during a part of the vertical movement of the latter and to remain at rest where the dies are effecting the last portion of their downward movement and the first portion of their upward movement a loose connection is provided between the stripping plate and the dies which preferably comprises upper and lower sets of guide eyes 33, 34 arranged on the dies, a plurality of upright guide rods 35 which slide in these eyes and each connected at its lower end with an adjacent part of the stripping plate and provided at its upper end with a stop or head 36 adapted to rest against the upper guide eyes 33 of the dies. While the dies are elevated the guide rods bear with their stop heads against the upper guide eyes 33 and the stripping plate is arranged below the lower ends or faces of the dies, as shown in Fig. 5, but when the dies are in their lowermost position and the stripping plate rests on the stops 32, the stop heads 36 of the guide rods are arranged above the upper eyes 33, as shown in Fig. 6.

For the purpose of facilitating the proper presentation of the lumps or balls of dough to the stamping or pressing position centering means are provided which take the lumps of dough after the same have been placed upon the rear part of the apron and move the same forwardly in such position on the apron that when the latter moves forwardly another step the centered lumps of dough will be in line respectively with the several dies. In its preferred form this centering mechanism is constructed as follows:

37 represents a centering cross head arranged transversely and horizontally above the receiving or rear part of the apron and guided at its opposite ends so as to be capable of reciprocating horizontally lengthwise of the machine. This guiding of the centering cross head is preferably accomplished by means of guide sleeves 38 arranged at opposite ends of the centering cross head and sliding upon guide rods 39 which are arranged horizontally and lengthwise upon the upper part of the main frame on opposite sides of the apron. The reciprocating movement is imparted to this centering cross head by means of a counter shaft 40 journaled horizontally and transversely in suitable bearings on the rear part of the main frame, two crank disks 41 arranged at opposite ends of the counter shaft, two connecting rods 42 connecting opposite ends of the centering cross head with the wrists or cranks 43 on the crank disks, and a belt 44 preferably of the chain type passing around driving and driven sprocket wheels 45, 46 mounted respectively on the driving shaft and counter shaft, as shown in Figs. 1–5.

Arranged in front of the centering cross head and immediately above the surface of the upper stretch of the apron are arranged a plurality of centering jaws or chucks 47 each of which is of substantially V-shaped form and arranged with its center in the vertical plane of one of the pressing or stamping dies. Each of these centering jaws is preferably adjustably connected with the centering cross heads so as to be capable of longitudinal adjustment relatively thereto, this being preferably effected by means of an arm 48 projecting rearwardly from each of the centering jaws and over the top of the centering cross head and provided with a longitudinal slot 49 which receives a clamping bolt 50 passing through the slot 49 and into the centering cross head. By this means each of the centering jaws can be accurately adjusted for causing the lump or ball of dough with which the same engages to accurately shift the same on the apron so that during the subsequent forward step of the latter the respective lump of dough will be accurately alined with the die intended to operate upon the same.

In the operation of the machine the operator places a set of dough lumps or balls on the apron in front of the centering jaws in the approximately correct position. During the next forward step of the apron the centering cross head also moves forwardly but at a somewhat faster speed so that the centering jaws engage with the lumps of dough and not only push the same forwardly but also shift the same laterally either in one direction or the other by reason of the rearwardly converging surfaces of the centering jaws, whereby the lumps of dough are placed accurately in a position on the apron which they should occupy in order that the same will be placed accurately into alinement with the respective dies during the next forward step of the apron and receive the proper impression or stamping of the dies during the next interval of rest of the apron. While the apron is at rest and the dies are forming the stamping operation on one set of dough lumps or balls the centering cross head moves rearwardly to enable the operator to place the next set of balls or lumps on the apron preparatory to centering the same and advancing them to the stamping position.

This roll stamping or pressing machine is very simple in construction, the same has no delicate parts which are liable to get out of order, it has a large capacity and requires but little power for its operation, and owing to the ease with which the dies can be interchanged it is possible to stamp or press different kinds of rolls without undue interruption of the machine or serious reduction in its output.

I claim as my invention:

A roll stamping machine comprising an intermittently movable support upon which the dough balls to be stamped are placed, dies movable toward and from said support for stamping the dough balls thereon, and means for centering the dough balls on said support preparatory to engaging the dough balls by said dies comprising a plurality of V-jaws reciprocable lengthwise above said support and each adapted to engage one of said dough balls and center the same on said support relatively to one of said dies, and each jaw provided with a rearwardly projecting slotted arm, a cross head engaged by the arms of said jaws, clamping bolts arranged in the slots of said arms and connecting the same with said head, longitudinal rods which are arranged on opposite sides of said support and on which opposite ends of said cross head are guided, crank disks arranged on opposite sides of said support, and connecting rods connecting the opposite ends of said cross head with the wrists of said crank disks.

JAMES W. RUGER.